United States Patent
Nowobilski et al.

(10) Patent No.: US 7,393,394 B2
(45) Date of Patent: Jul. 1, 2008

(54) ADSORBENT VESSEL WITH IMPROVED FLOW DISTRIBUTION

(75) Inventors: Jeffert John Nowobilski, Orchard Park, NY (US); Cem Celik, Tonawanda, NY (US)

(73) Assignee: Praxair Technology, Inc., Danbury, CT (US)

( * ) Notice: Subject to any disclaimer, the term of this patent is extended or adjusted under 35 U.S.C. 154(b) by 401 days.

(21) Appl. No.: 11/261,667

(22) Filed: Oct. 31, 2005

(65) Prior Publication Data
US 2007/0095212 A1   May 3, 2007

(51) Int. Cl.
*B01D 53/04* (2006.01)
(52) U.S. Cl. .............................. 96/152; 422/177; 55/418
(58) Field of Classification Search ................ 96/108, 96/139, 152; 422/171, 177; 55/418
See application file for complete search history.

(56) References Cited

U.S. PATENT DOCUMENTS

| | | | |
|---|---|---|---|
| 3,720,043 A | * | 3/1973 | Kovach ........................ 95/116 |
| 4,372,857 A | | 2/1983 | Matthews et al. |
| 5,298,226 A | | 3/1994 | Nowobilski .................. 422/171 |
| 5,538,544 A | * | 7/1996 | Nowobilski et al. ........... 96/152 |
| 5,779,773 A | * | 7/1998 | Cam et al. ..................... 96/152 |
| 5,873,929 A | | 2/1999 | Andreani et al. |
| 6,129,780 A | | 10/2000 | Millet et al. ................... 95/117 |
| 6,375,723 B1 | * | 4/2002 | Zadeh et al. ................... 96/139 |
| 6,605,135 B2 | * | 8/2003 | Lee et al. ........................ 95/90 |
| 2005/0155492 A1 | | 7/2005 | Baksh et al. |

FOREIGN PATENT DOCUMENTS

EP    1 080 772    3/2001

* cited by examiner

*Primary Examiner*—Frank M Lawrence
(74) *Attorney, Agent, or Firm*—Flora W. Feng, Esq.

(57) ABSTRACT

An adsorbent vessel comprising adsorbent material within the vessel interior positioned above at least one layer of support media, and a perforated baffle resting on the support media and not attached to the vessel shell whereby gas flow into the vessel from an inlet nozzle and a lengthwise oriented plenum is more evenly distributed for flow through the adsorbent material.

12 Claims, 4 Drawing Sheets

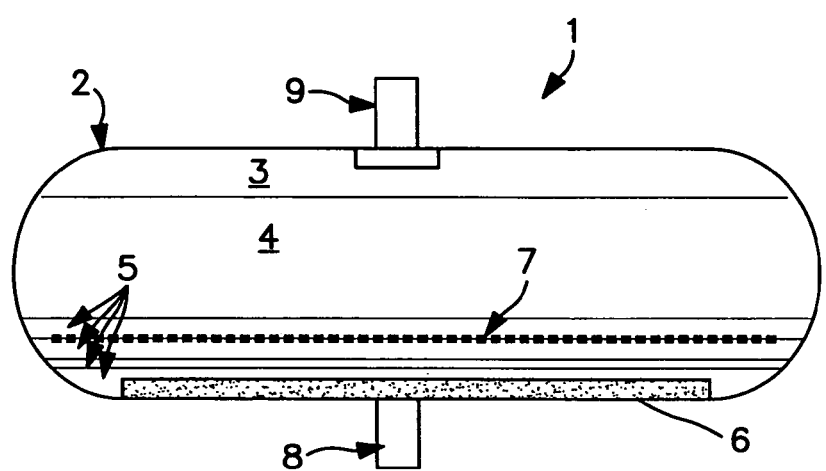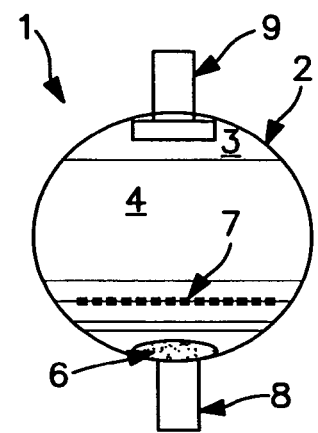
FIG. 1  FIG. 2

ADSORBENT VESSEL WITH IMPROVED FLOW DISTRIBUTION

TECHNICAL FIELD

This invention relates generally to adsorbent vessel systems having a bed of adsorbent material on at least one layer of support material.

BACKGROUND ART

Adsorption is employed for the separation of one or more impurities or other substances from a gas stream. Typically adsorbent material, such as molecular sieve, is positioned within an adsorbent vessel on a bed support, and gas is passed into the vessel and through the adsorbent material. As the gas passes through the adsorbent material impurities or other substances are adsorbed from the gas onto the adsorbent material.

It is important for the efficient operation of the adsorption process that the flow of gas be distributed relatively uniformly along and across the adsorbent bed. Non-uniform gas flow is a particular problem for systems employing a vessel having a length which is significantly greater than its width, for example by a factor of at least 1.5 to 1. In such situations the gas inlet system does not distribute the flow of gas uniformly into the expanding head region or into the curved shell regions of such horizontal or longitudinal adsorption vessels.

SUMMARY OF THE INVENTION

The present invention comprises: An adsorption vessel comprising a shell defining a vessel interior; gas provision means for providing gas into the vessel interior said gas provision means comprising an inlet nozzle communicating with an inlet plenum which extends over the major portion of the length of the adsorption vessel; at least one layer of support media within the vessel interior; adsorbent material within the vessel interior positioned above the support media; and a perforated baffle resting on the support media and not attached to the shell.

BRIEF DESCRIPTION OF THE DRAWINGS

FIG. 1 is simplified cross sectional side view of one preferred embodiment of the adsorption vessel of this invention.

FIG. 2 is a cross sectional end view of the embodiment of the invention illustrated in FIG. 1.

Figure 3:
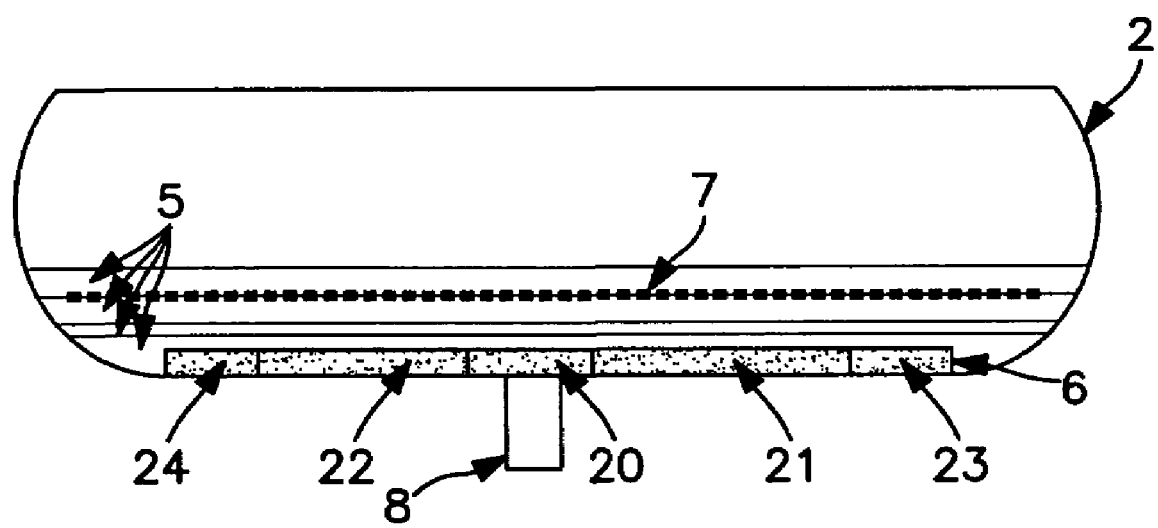
FIG. 3 is a cross sectional side view of one preferred embodiment of the invention showing an inlet plenum with varied sections.

The numerals in the Drawings are the same for the common elements.

DETAILED DESCRIPTION

The invention will be described in detail with reference to the Drawings. Referring now to FIGS. 1 and 2, there is shown adsorbent vessel 1 having a vessel shell 2 defining a vessel interior 3 which contains adsorbent material 4 positioned above at least one layer of support media 5. Preferably, as shown, the support media comprises graded layers, such as of inactive tabular alumina balls and activated alumina beads. One particularly preferred application of the adsorbent vessel of this invention is for the removal by adsorption of carbon dioxide and water vapor from an air stream, and it is in conjunction with this particularly preferred application that the invention will be now described.

The inlet air plenum 6 in the bottom of the vessel 1 can distribute the air along the length of the vessel but cannot distribute the flow uniformly into the expanding head region or into the curved shell regions. The invention comprises a perforated baffle plate 7 in the graded ball support layer 5 above the inlet plenum 6 to aid in distributing the feed flow to the adsorbent bed 4. The perforations can be varied along the length and across the width of the baffle plate to redistribute the flow to the bed. The perforated plate preferably is imbedded in the ball bed support and thus is free floating and not attached to the vessel walls.

The air enters the bottom of the vessel through inlet nozzle 8 centered along the length of the vessel 1. The vessel nozzle 8 is usually directly connected to a piping elbow outside the vessel which can force the flow to one side of the pipe. The flow then enters plenum 6 which runs along the major portion of the horizontal length of the vessel. The plenum 6 is formed by the bottom shell wall and a perforated arched plate. The flow is turned, split into two equal parts, and travels down plenum 6. The top of plenum 6 is a variable open area perforated plate which compensates for the dynamic effects of the flow along the length of the plenum. The dynamic effects include the velocity head of the fluid entering the vessel at the nozzle, the pressure rise in the plenum as the flow velocity decreases due to mass loss out of the plenum, and the effect of the external piping, such as an elbow, on the flow into the plenum. The perforations in the circumferential direction of the plenum are a uniform open area. The perforations along the length of the plenum are typically varied in sections as shown in FIG. 3. The open areas preferably are from 0 to 10 percent in section 20, from 5 to 25 percent in sections 21 and 22, and from 15 to 50 percent in sections 23 and 24. The plenum plate hole diameter is preferably less than 0.5 inch.

Figure 4:
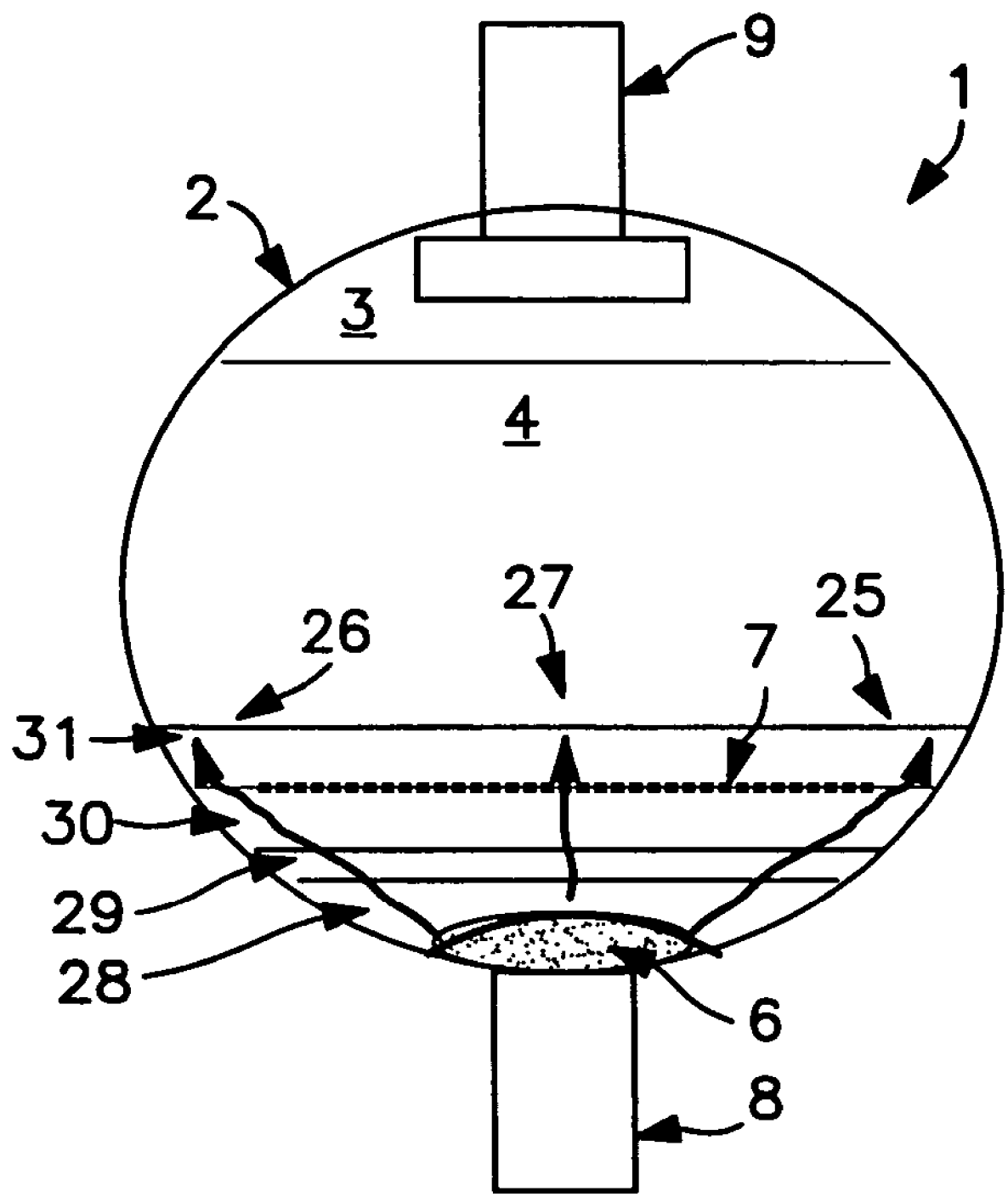
FIG. 4 is a cross sectional end view of one embodiment of the invention showing gas flow streamlines from the inlet plenum.

The flow exiting the plenum enters the first layer of the graded ball bed support system. As shown in FIG. 4 the fluid exiting the edges of the plenum in flow streams 25 and 26 has further to travel to reach the bottom edge of the adsorbent bed than the fluid exiting the center of the plenum in flow stream 27 has in order to reach the bottom center of the adsorbent bed. This results in more flow going to the center section of the vessel than to the edge of the vessel. Varying the circumferential open area of the distributor will have little effect on the flow distribution at the bottom of the bed because the change occurs a large distance from the bed and it will not force uniform flow to the bottom edges of the bed. Making the distributor larger and flatter also helps the flow distribution but results in a more expensive inlet plenum. Varying the inert ball heights within the layers will result in more uniform flow to the bed but this is very difficult to implement in a large vessel and has only limited control of the flow maldistribution. In the particularly preferred embodiment illustrated, the support media comprises four layers. Layer 28 comprises 1 inch diameter alumina balls, layer 29 comprises 0.5 in diameter alumina balls, layer 30 comprises 0.25 inch diameter alumina balls, and layer 31 comprises 0.125 diameter alumina balls.

Figure 5:
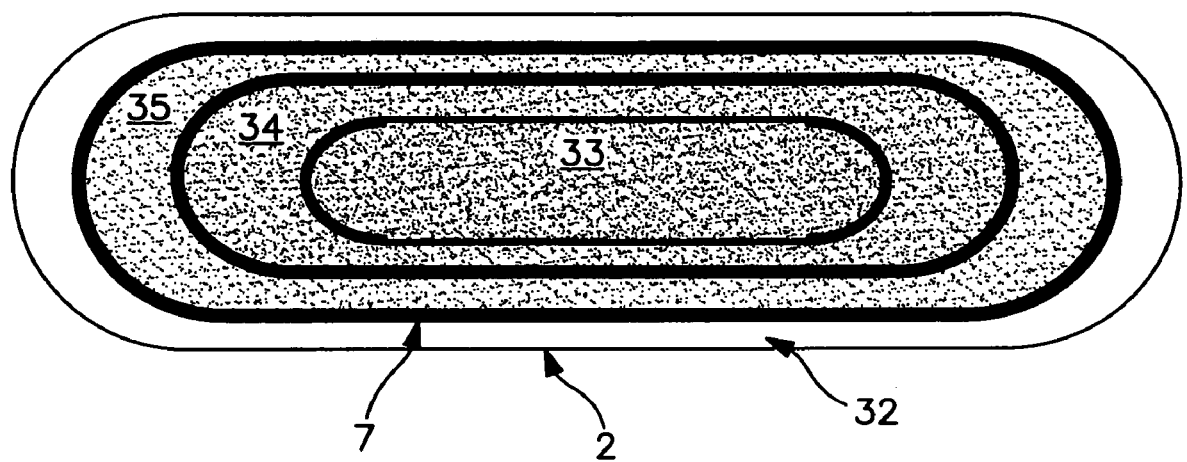
FIG. 5 is a plan view of one embodiment of the invention showing surface areas of the baffle having different open areas so as to facilitate gas flow toward the periphery of the vessel and thus effect improved gas flow.

Free floating, perforated baffle 7 is placed between support media layers 30 and 31. At this location the baffle is close to the bottom of the adsorbent bed so that changes in the flow will not be negated by large changes in the geometry of the vessel. The baffle perforations vary across the width and length of the baffle. The baffle will not reach the walls of the vessel along its perimeter. That is, it will have a 100% open area at the edge of the vessel in section 32. The typical open areas, shown in FIG. 5, will vary from within the range of from 3 to 20 percent in the center of the baffle in section 33, within the range of from 10 to 40 percent in section 34, and within the range of from 20 to 50 percent in section 35. The open area along the axial centerline of the baffle will also vary to smooth out any longitudinal variation in the flow due to flow dynamics in the inlet plenum. The baffle extends into the vessel head area in order to smooth the flow in that area. The inlet plenum does not extend into the head area due to the complex curvature of the head, therefore the baffle will compensate for the inlet plenum not extending into the head area.

The preferred mechanical design of the baffle is a relatively thin metal plate, typically within the range of from 1/16 to 1/8 inch, which would be smaller than the diameter of the manway entrance into the vessel or outlet nozzle and the full width of the baffle. Each section of the baffle preferably is covered on the top and bottom with metal screen which would stop the support media alumina balls from plugging the holes in the baffle plate. The individual plates would be placed on the top of the leveled ball supports. The individual plates are preferably bolted together to form the entire baffle so that the individual pieces are not inadvertently moved when the next layer of balls are placed on top of the baffle. The array of plates are strong enough to walk on without bending but the individual sections are light enough to be easily handled. Once the baffle is installed in the vessel the 1/8" alumina is poured on top of the baffle plate holding it in place. The filling of the remainder of the bed would then be completed as normal. By varying the hole distribution in the inlet plenum the best flow distribution that can be achieved will have a broad central peak which is at least 6 percent higher than at the edges. This variation runs the entire length of the vessel. Reducing the open area of the center section of the plenum to zero only marginally reduces the peak while increasing the pressure drop. The addition of the perforated baffle provides a mechanism to reduce the flow variation at the bottom of the bed to about 2 percent while only slightly increasing the pressure. The purified gas passes out from the adsorbent vessel through outlet nozzle 9.

The preferred embodiment is to apply the baffle to a horizontal vessel with a single inlet nozzle but the baffle will also be effective on a vessel with multiple nozzles. The difference in the baffle would be that the perforations would vary along the length of the baffle in order to correct for the flow variations introduced due to the multiple nozzles. In general multiple nozzles improve the flow distribution due to the lower entrance velocity and a reduction of the flow path length from the nozzle to the furthest point in the bed. The complication that multiple nozzles add is that each nozzle adds an additional area where the flow must be turned to enter the inlet plenum. These regions can result in flow maldistribution that propagates up into the bed resulting in poor performance.

The preferred application of the invention is in horizontal vessels due to the large size of the vessels and complex flow path but the invention could also be applied to vertical cylindrical vessels which utilize a graded ball bed support system. In this case the baffle perforations would be generally circumferentially symmetric due to the vessel geometry. In this case, as with horizontal vessels, the flow dynamics of the external piping could result in flow maldistribution that would alter the symmetry of the baffle perforations.

In the preferred application the layers of the graded ball support are kept horizontal for ease in loading the vessel. Correcting the flow maldistribution is performed by the inlet plenum and the baffle. It is possible to vary the depth of the ball support layers in order to aid in the flow distribution. The baffle would then either span two layers or be within a single layer. If the baffle were made flexible then it could be made to follow the contour shape of the graded ball support layer and thus the baffle could be placed at and interface between two support layers. The preferred location of the baffle in the illustrated embodiment is between the 1/4" and 1/8" diameter ball support layers but it would be possible to place the baffle within the 1/8" ball support layer in order to locate the baffle closer to the adsorbent bed and to reach a larger portion on the bed bottom surface. In the extreme case the baffle could be placed between the bottom of the adsorbent bed and 1/8" ball support layer. The preferred baffle is made of perforated metal plate but the baffle could also be produced from perforated plastic such as polyethylene. In this case the baffle could be rolled into sections, passed through the manway and unrolled in the vessel. This would result in a faster assembly time in the vessel.

The preferred open area of the baffle is such that the improved flow distribution is obtained at a minimum of pressure drop penalty and as such the edges of the baffle do not reach the walls of the vessel and the open area in the center of the baffle is about 5% and changes to about 50% at the edge. In some cases where the pressure penalty is not large the center open area could be reduced to below 5% or even to 0% and the baffle could be extended to the wall of the vessel and have an edge open area of only about 25%. In some cases it may be desirable to fill the entire area above the bed with inert ceramic balls in order to reduce the void volume in the vessel or restrain the bed. In that case a similar baffle design embedded in the top ceramic balls would provide improved flow distribution to the bed during any portions of the cycle in which the flow enters the bed from the top for the vessel. In the case of air prepurification the purge gas enters from the top of the bed, and since the geometry and pressure drop concerns are similar to the feed flow entering from the bottom of the vessel, the baffle design would be similar.

Although the invention has been described in detail with reference to a certain particularly preferred embodiment, those skilled in the art will recognize that there are other embodiments of the invention within the spirit and the scope of the claims. For example other support media which may be used include activated alumina ball supports, glass, plastic or metal balls, and natural rounded stone or crushed stone, although the cost, pressure drop, or material compatibility of these materials may not be as desirable as ceramic balls. Other adsorbents which may be used include alumina sieve mixtures, 13X sieves, silica gels, and NaY. Other applications include VPSA air separation vessels, filtration beds, exchange beds, catalysis beds, and regenerator vessels.

The invention claimed is:

1. An adsorption vessel comprising a shell defining a vessel interior; gas provision means for providing gas into the vessel interior said gas provision means comprising an inlet nozzle communicating with an inlet plenum which extends over the major portion of the length of the adsorption vessel; at least one layer of support media within the vessel interior; adsorbent material within the vessel interior positioned above the support media; and a perforated baffle resting on the support media and not attached to the shell.

2. The adsorbent vessel of claim 1 wherein the support media comprises inactive tabular alumina balls.

3. The adsorption vessel of claim 1 wherein the support media comprises activated alumina beads.

4. The adsorbent vessel of claim 1 wherein the support media comprises a plurality of layers.

5. The adsorbent vessel of claim 4 wherein each layer of the support media which has a layer of support media above it is comprised of particles having an average size which is larger than the average size of the particles which comprise the layer of support media above it.

6. The adsorbent vessel of claim 1 wherein the baffle rests on top of all the support media.

7. The adsorbent vessel of claim 1 wherein the baffle rests on top of some of the support media, and other support media rests on the baffle.

8. The adsorbent vessel of claim 1 wherein the perforations on the baffle are all the same size.

9. The adsorbent vessel of claim 1 wherein the perforations on the baffle are not all the same size.

10. The adsorbent vessel of claim 1 wherein the baffle is comprised of a plurality of pieces.

11. The adsorbent vessel of claim 1 further comprising screen material on at least one side of the baffle.

12. The adsorbent vessel of claim 1 further comprising screen material on both sides of the baffle.

\* \* \* \* \*